UNITED STATES PATENT OFFICE.

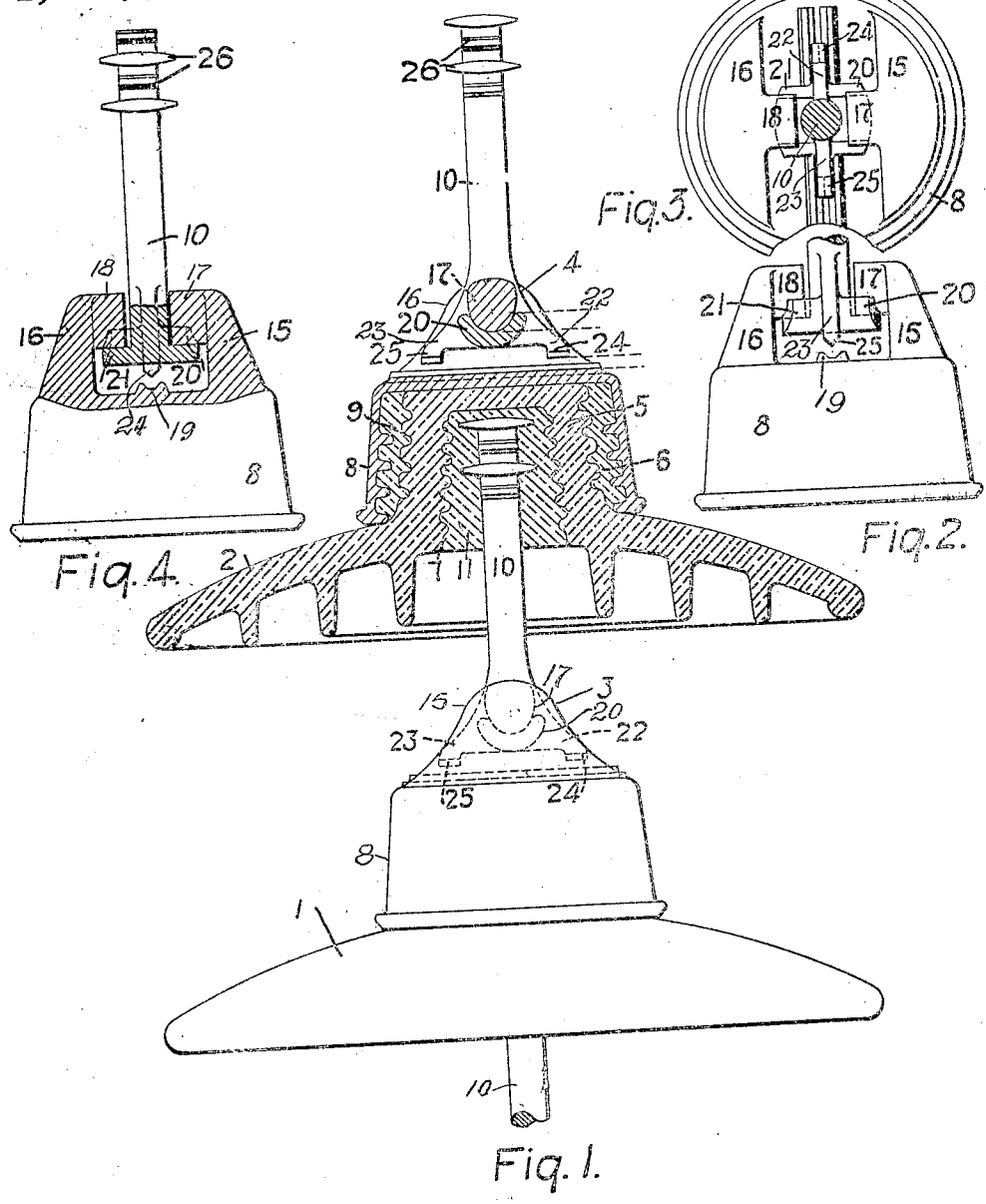

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SUSPENSION DEVICE.

1,286,010.   Specification of Letters Patent.   Patented Nov. 26, 1918.

Application filed December 8, 1915. Serial No. 65,677.

*To all whom it may concern:*

Be it known that I, RAY P. JACKSON, a citizen of the United States, and a resident of Edgewood Park, in the county of Allegheny and State of Pennsylvania, have invented a new and useful Improvement in Suspension Devices, of which the following is a specification.

My invention relates to suspension devices and particularly to suspension devices for insulators that are used in high-potential electric circuits.

One object of my invention is to provide a suspension device of the above-indicated character that may be readily assembled or separated without the use of tools.

A further object of my invention is to provide a suspension device or coupler of the above specified class that shall be effectively locked against unintentional disengagement and that shall, while in locked relation, permit of considerable relative movement or play between the interlocking members thereof.

Figure 1 of the accompanying drawing is a side view, partially in section and partially in elevation, of a portion of an insulator embodying my invention. Fig. 2 is an elevational view of a portion of the connector shown in Fig. 1. Fig. 3 is a plan view of the device shown in Fig. 2, and Fig. 4 is a view, partially in section and partially in elevation, of the connector shown in Fig. 2.

The insulator shown in the drawing comprises a plurality of insulator units 1 and 2 that are connected to each other by a plurality of connecting devices 3 and 4. Each of the insulator units 1 and 2 is provided with an upwardly-projecting frusto-conical portion 5 having external corrugations 6 and an internal corrugated recess 7. Each of the connecting devices 3 and 4 is also provided with an internally-corrugated cap member 8 that is disposed around the upwardly-projecting portion 5 and is secured thereto by cement 9 or other suitable material. Each connecting device is also provided with a rod member 10, the upper end of which is secured within the recess 7 of an adjacent insulator unit by means of suitable cementing material 11.

Each of the cap members 8 is also provided with two upwardly-projecting portions 15 and 16 having oppositely-projecting and substantially cylindrical lugs 17 and 18, respectively. A grooved ridge 19 is diametrically disposed across the cap member 8 intermediate the upright members 15 and 16.

The lower end of the rod member 10 is provided with two oppositely and outwardly-projecting socket portions 20 and 21 that are substantially semi-cylindrical in form and are adapted to coöperate with the lugs 17 and 18, respectively, of the cap member 8. The lower end of the rod member 10 is also provided with outwardly-projecting arms 22 and 23 that are positioned at right angles to the socket portions 20 and 21 and have, at their outer extremities, downwardly-projecting channel-engaging members or lips 24 and 25.

In order that the rod member 10 may be more firmly secured in the cement 11, the upper end thereof is provided with a plurality of oppositely and laterally-extending projections 26 that are arranged in pairs positioned at right angles with respect to each other.

To remove the rods 10 from the cap member 8, it is necessary only to turn the rod member through a slight angle about its axis until the channel-engaging members 24 and 25 bridge the grooved ridge 19 and then withdraw the rod member by moving it laterally across the face of the cap member. The members are assembled by reversing the order of the above specified operations.

It will readily be seen that the connecting parts of the device are positively locked against unintentional disengagement by the coöperation of the channel-engaging members 24 and 25 with the channeled portion 19, but it will also be seen that a considerable degree of relative movement of the interlocking parts is, nevertheless, permitted.

I do not wish to be restricted to the specific structural details herein set forth, since various modifications thereof may be effected without departing from the spirit and scope of my invention, and I desire, therefore, that only such limitations shall be imposed as are indicated in the appended claims.

I claim as my invention:

1. A suspension device comprising a retaining member having a recessed ridge and a plurality of oppositely-projecting lugs, and a suspension member one end of which has outwardly-projecting socket portions to coöperate with said lugs and outwardly and downwardly-projecting portions to coöperate with the recessed ridge of said retaining member.

2. A suspension device comprising a retaining member having a ridge and a plurality of inwardly-projecting lug portions, and a suspension member one end of which has socket portions to engage said lug portions and outwardly and downwardly-projecting portions to engage said ridge.

3. A suspension device comprising a retaining member having internally-projecting lugs and a grooved portion between said lugs, and a suspension member having two outwardly-projecting socket members to engage said lugs and a downwardly-projecting ridge portion to engage said grooved portion.

4. A suspension device comprising two coöperating and separable members, one of which has a plurality of socket portions and the other of which has corresponding lugs to engage said socket portions, one of said members also having rigid projections to coöperate with a recess in the other member.

5. The combination with a plurality of spaced insulator units, of connectors extending therebetween that severally comprise two coöperating and separable members, one of which has a plurality of socket portions and the other of which has corresponding lugs to engage said socket portions, one of said members being also provided with rigid projections to coöperate with a recess in the other member.

6. A suspension device comprising two separable interlocking members one of said members having a lug portion and the other a socket portion adapted to engage said lug portion, and means comprising a rigid projecting portion on one of said members and a recessed portion on the other of said members for preventing the accidental disengagement of the lug and socket portions.

7. A suspension device comprising a retaining member having a longitudinal recessed ridge on a surface thereof, a plurality of portions projecting from the plane of said surface at opposite sides of said ridge, a lug on each of said projecting portions projecting toward the other but spaced therefrom, a suspension member disposed between the ends of said lugs, socket portions on said suspension member to coöperate with said lugs and portions extending in the direction of said ridge from said suspension member, the latter of said portions being normally out of said recess but of such relation thereto as to prevent accidental disconnection of said suspension member from said retaining member.

In testimony whereof I have hereunto subscribed my name this 30th day of Nov., 1915.

RAY P. JACKSON.